US006183787B1

(12) United States Patent
Ishigaki et al.

(10) Patent No.: US 6,183,787 B1
(45) Date of Patent: Feb. 6, 2001

(54) QUALITY IMPROVER FOR USE IN PRODUCING BREAD

(75) Inventors: Reisaburo Ishigaki; Ryuichi Iizuka, both of Shizuoka (JP)

(73) Assignee: Yugengaisha Soi, Shizuoka (JP)

( * ) Notice: Under 35 U.S.C. 154(b), the term of this patent shall be extended for 0 days.

(21) Appl. No.: 09/440,977

(22) Filed: Nov. 16, 1999

(30) Foreign Application Priority Data

Apr. 22, 1999 (JP) .................................................. 11-115020

(51) Int. Cl.$^7$ ................................ A21D 2/00; A21D 8/02; A21D 10/00
(52) U.S. Cl. .............................. 426/18; 426/19; 426/21; 426/28; 426/31; 426/64; 426/72; 426/549; 426/653
(58) Field of Search .................. 426/18, 19, 21, 426/28, 31, 64, 72, 549, 653

(56) References Cited

U.S. PATENT DOCUMENTS

| | | | |
|---|---|---|---|
| 3,655,403 | * | 4/1972 | Vidal ........................................ 99/91 |
| 4,005,225 | * | 1/1977 | Craig et al. ............................. 426/21 |
| 4,551,334 | * | 11/1985 | Zentner .................................... 426/26 |
| 5,650,188 | * | 7/1997 | Gaubert et al. ....................... 426/549 |
| 5,716,654 | * | 2/1998 | Croenendaal ........................... 426/62 |
| 5,891,492 | * | 4/1999 | Ishigaki .................................. 426/44 |
| 6,007,850 | * | 12/1999 | Van Dunijnhoven et al. ........ 426/20 |
| 6,066,352 | * | 5/2000 | Ogasawara et al. ................. 426/549 |

FOREIGN PATENT DOCUMENTS 7313142  3/1995 (JP) .

OTHER PUBLICATIONS

Hickenbottom; Cereal Foods World; 41(10): 780–790 (Oct./ 1966).

* cited by examiner

*Primary Examiner*—Nina Bhat
(74) *Attorney, Agent, or Firm*—Hovey, Williams, Timmons, & Collins

(57) ABSTRACT

A quality improver for producing bread, comprising at least one component (i) selected from malt, rice fermentation product, and wheat fermentation product and (ii) biotin. Preferably it further contains mevalonolactone and/or mevalonic acid or a lactic acid fermentation product of soy bean. A seed dough is obtained by kneading cereal powder, yeast, and the quality improver for producing bread and subjecting the mixture to primary fermentation. The bread has a sufficient volume, a good shape, a soft feeling upon eating, a good flavor (fragrance and taste), excellent storage stability and contains vitamins, proteins and minerals abundantly. The seed dough containing the quality improver can be circulated.

9 Claims, No Drawings

QUALITY IMPROVER FOR USE IN PRODUCING BREAD

BACKGROUND OF THE INVENTION

1. Field of the Invention

The present invention relates to a quality improver for use in producing bread that can give bread having a good dough property upon baking and being excellent in shape after baking, feeling upon eating and taste and difficult to be aged, to a method for producing bread using the quality improver and to bread produced using the quality improver as well as to a seed dough that can be stored at low temperatures and commercially circulated.

2. Description of the Related Art

Various developments for improving the flavor and feeling upon eating of bread have hitherto been produced. In particular, plain bread is required of flavor of bread itself, shape of bread after baking, feeling upon eating, etc. so that it is necessary to commercially produce bread that has soft feeling upon eating, good flavor and good storage stability.

Plain bread is produced generally by mixing wheat flour and yeast, kneading them and then allowing to primary fermentation to occur, dividing and molding the primarily fermented bread dough (seed dough), subjecting the molded bread to heating in an oven (finishing fermentation) at 30° C. and then baking.

As the production method for plain bread, there has been known a so-called straight method in which such a work as above is performed in a series of operations and primary fermentation is performed using a sugar-added seed dough at a temperature of about 27 to 30° C. in a short time. According to the straight method, generally bread having good flavor can be obtained. However, the bread tends to be aged quickly and the storage stability of the bread is poor. Also, a so-called intermediate seed method (sponge and dough method) is widely practiced, in which a sugar-non-added seed dough for plain bread is subjected to primary fermentation at a lower temperature (e.g., about 24° C.) and for a longer time than in the straight method to prepare a seed dough (intermediate seed, sponge dough) and then sugar is added to the intermediate seed, which is kneaded together with wheat flour and division as well as molding and subsequent operations are carried out. In the case of intermediate seed method, a bread dough extends well and bread having soft feeling upon eating and good storage stability can be obtained. However, it has the problem that long fermentation time results in the generation of acid odor due to excessive fermentation, which deteriorates the flavor of bread.

In the straight method or the intermediate seed method, the fermentation of seed dough must be carried out under precisely controlled temperature and time in order to obviate excessive fermentation or insufficient fermentation so that the fermentation operation takes much labor. Therefore, circulation of a seed dough has been keenly desired but the circulation has been difficult. That is, in the seed dough containing yeast, the fermentation is not stopped by cooling or at normal temperatures. Therefore, excessive fermentation tends to occur during circulation and bread produced by using such a seed dough has deteriorated flavor. In freezing storage, the fermentation products (budding yeast) suffer damages due to freezing so that use of a frozen seed dough fails to give bread with a sufficient volume and having a good flavor.

Under the circumstances, methods for improving the circulation of a seed dough have been proposed. For example, Japanese Patent Application Laid-open No. Hei 8-242756 discloses that adjustment of the amount of water in the fermentation seed preliminarily alcohol fermented to 5 to 40% with powder of cereals enables the seed dough to be circulated in a cold state or at a normal temperature, thereby eliminating the step of fermenting a seed dough in the bread producing line to produce bread in a short time and producing bread having a good flavor, a soft inner phase and a soft feeling upon eating as well as good storage stability. As a method for enabling a dough to be frozen storable and circulable, it has been proposed to select a combination of yeasts so that they have different active temperature characteristics (Japanese Patent Application Laid-open No. Hei 7-313142).

To improve the flavor, shape after baking and feeling upon eating of bread, various substances have conventionally been added to a bread dough. For example, there has been known a method for increasing the activity of yeast including adding sugars and further saccharifying enzymes, koji (Aspergillus), etc. to supply sugars yeast assimilates. To give a fragrance, it has been known to add sake lees, a lactic acid fermentation product, fruit, etc. When a seed dough is produced, there is a trend that various synthetic chemicals that are not useful to human body are added as a quality improver, for example, for giving a soft feeling upon eating. For example, an emulsifier, a bromate oxidizing agent, etc. are added together with yeast food. In particular, in the case of emulsifiers such as glycerides, synthetic chemical preparations are used frequently commercially in view of the fact that they are more readily available than natural products and they are homogeneous.

Such bread is staple food, which is taken frequently and hence it is undesirable to add chemical synthetic additives thoughtlessly. Heretofore, natural materials, in particular those that function as yeast food, emulsifiers, etc. upon the production of a seed dough have not been known. Accordingly, there has been a keen desire for the development of a natural material quality improver that can give rise to bread of a desired quality when replacing thereby the chemical synthetic additives currently used widely and that can be utilized in the production of bread on a commercial scale without decreasing productivity.

SUMMARY OF THE INVENTION

Under the circumstances, the present invention has been accomplished and an object of the present invention is to provide a natural material quality improver for producing bread that has excellent dough property upon producing bread, a soft feeling upon eating, a fine texture, a sufficient volume and a good shape, a good flavor (fragrance and taste), in particular excellent in durability of a fragrance, a seed dough using the quality improver that can be circulated, a method for producing bread and bread.

As a result of intensive study with view to obtaining the above-described quality improver for producing bread, the present inventors have found that a quality improver comprising at least one component (i) selected from malt, a rice fermentation product, a wheat fermentation product and a natural vitamin, in particular biotin, and preferably further mevalonolactone is natural component and use of the quality improver in place of a conventional quality improver comprising a chemical synthetic product, bread that is excellent in any of a flavor, a volume and a shape as well as a feeling upon eating of bread can be obtained.

The component (i) contains taste components such as a sugar, a fragrance component such as an ester, and in addition a vitamin such as pantothenic acid or biotin. Therefore, it is considered that vitamins required for yeast can be supplied by addition of the component (i) alone to activate the yeast. However, it has not been anticipated that supplement of biotin among vitamin groups can exhibit the above effect.

The present inventors have found that addition of mevalonolactone as a mevalonic acid component together with biotin is preferable since the above effect is enhanced.

The amount of biotin added in the present invention is a large amount as compared with the amount of biotin usually contained in the above component (i), so that the amount of biotin contained in the quality improver of the present invention substantially corresponds to the amount of supplement.

The quality improver consisting of these components comprises natural compounds that are safe to human body and have the functions of a conventional emulsifier, a yeast food and an oxidizer consisting of chemical synthetic products and hence it can be used in place of the chemical synthetic products.

Furthermore, it has been found that the seed dough prepared from a bread dough containing these components exhibits the above effect and can be circulated even after stored at low temperatures and thus the present invention has been accomplished.

That is, the present invention provides a quality improver for producing bread comprising at least one component (i) selected from malt, a rice fermentation product, and a wheat fermentation product and biotin added thereto.

In the present invention, it is desirable that mevalonolactone as a mevalonic acid component be added together with biotin. That is, the quality improver of the present invention further contains mevalonolactone and/or mevalonic acid.

Preferably, the quality improver of the present invention further contains a lactic acid fermentation product of soy bean.

The biotin is added in an amount of preferably 0.1 part by weight or more per 100 parts by weight of the component (i) on a dry basis.

Mevalonolactone is added in an amount of preferably 0.1 part by weight or more per 100 parts by weight of the component (i) on a dry basis.

The lactic acid fermentation product of soy bean is added in an amount of preferably 10 to 100 part by weight per 100 parts by weight of the component (i) on a dry basis.

The above component (i) is preferably malt or rice fermentation product.

The present invention also provides a seed dough obtained by kneading cereal powder for producing bread, yeast and a quality improver as described above and subjecting the kneaded composition to primary fermentation.

The method for producing bread of the present invention uses cereal powder, yeast, and the quality improver for producing bread as described above and the present invention also provides bread obtained by the method of the invention.

DETAILED DESCRIPTION OF THE INVENTION

Hereafter, the present invention will be described in detail.

The quality improver for producing bread of the present invention contains as essential components at least one component (i) selected from malt, a rice fermentation product, and a wheat fermentation product and (ii) biotin.

In the component (i) as described above, specific examples of the malt include malt obtained during beer production processes. Rice bud, i.e., hulled rice germinated can be also used. Specific example of the fermentation products of rice and wheat include rice wine extraction residue (sake lees) and beer lees. The component (i) is usually saccharified due to decomposition by endogenous enzyme upon germination or by koji or the like added from the outside.

The component (i) used is preferably a dry product from the viewpoint of ease of operation. Herein, a product that has a water content of 5% or less is called a dry product.

The drying method is not limited to spontaneous drying but various known drying methods may be used widely. In the case of sake lees, for example, there have been proposed a method in which an excipient such as dextrin is added before it is dried and a method in which enzymatic decomposition is performed before it is dried. Drying may be performed by any method so long as the flavor and fragrance before drying can be retained. The dry component (i) is preferably in the form of granules.

In the present invention, specific examples of the component (i) that can be used include dry products available as commercial products, e.g., malt powder (extracts), rice bud powder (extracts), fermented rice powder such as dry sake lees, dry malt lees. As the component (i), one of the above-described ones may be used or suitable combinations of two or more of them may be used. Among them, malt powder and fermented rice powder are used preferably.

The above component (i) may have slightly varied composition depending on the place of production or brewer. Specifically, sake lees, as an example of fermented rice product, in the state where it is pressed to have a water content of about 40%, usually contains glucides (about 20 to about 23%), proteins (about 15 to about 20%), alcohol (about +8%), food fibers (about 5%), lipids (about 1.5 to about 4.5%) as main components. Furthermore, sake lees contains fermentation products, etc. Malt, more specificallyt malt extracts powder having a water content of about 3.72%, contains crude proteins, etc. in amounts of about 10%.

Each member of the above component (i) contains vitamins such as pantothenic acid, biotin, etc. abundantly. For example, it is known that 100 g of dry product of malt contains about 5 $\mu$g of biotin (CEREAL FOODS WORLD/Oct. 1996, vol. 41, 788–790, No. 10).

Upon analysis of pressed residue of sake having a water content of about 8.5%, for example, it revealed that it contained about 10 $\mu$g of biotin and about 0.5 mg of pantothenic acid per 100 g (analyzed by Japan Food Analysis Center).

In the present invention, the component (i) as above is further supplemented with biotin, and preferably mevalonolactone is further added.

As described above, 100 g of the dry product of component (i) contains an extremely small amount, e.g., about 5 to about 10 $\mu$g ($\gamma$) of biotin, and when sake lees or the like is added upon producing bread in a conventional manner, an extremely small amount of biotin is spontaneously supplied. In the present invention, biotin and further mevalonolactone are added.

Biotin can be obtained by extraction from the above component (i).

More specifically, biotin is added intensionally as a substantially pure substance in an amount of preferably 0.1 part by weight or more per 100 parts by weight of the above component (i) on a dry basis, usually it is added in an amount of 0.1 to 3.5 parts by weight. Addition of biotin in such an amount results in that the effects of the present invention can be exhibited sufficiently.

Biotin added in such an amount is considerably more than the amount to be supplied as accompanied by the addition of the component (i) (several γ per 100 g of the component (i), i.e., in the order of about $10^{-6}$ g) and the amount of biotin to be added to a bread dough substantially corresponds to this addition (supplement) amount.

By addition of biotin together with the above component (i) to a bread dough, the flavor of bread can be improved and bread having a sufficient volume and having a better shape than is obtainable without adding biotin but adding the component (i) can be obtained. Here, bread having a good shape means bread that retains its shape without being collapsed, develops well and along a mold to have a sufficient volume when a divided and molded seed dough is charged in a mold and heated in an oven to effect finish fermentation and baked.

In the present invention, it is more effective to add mevalonolactone in addition to the above biotin.

Mevalonolactone is used in order to have mevalonic acid contained in bread. That is, mevalonic acid [$HO-CH_2CH_2C(CH_3)(OH)CH_2-COOH$] readily undergoes intramolecular dehydration to form a lactone derivative so that it is difficult to use mevalonic acid itself as it is and usually a lactone form is used instead. It is considered that in bread it exists as mevalonic acid and/or mevalonolactone. This reaction as illustrated below is reversible.

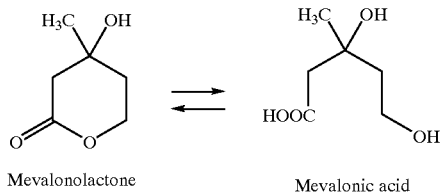

Mevalonolactone          Mevalonic acid

The specific addition amount of mevalonolactone is preferably 0.1 part by weight or more per 100 parts by weight of the above component (i) on a dry basis (at a water content of 5% or less) and usually it is desirable that it is added in an amount of 0.1 to 3.5 parts by weight.

It has been elucidated that mevalonic acid, identical with hiochic acid, serves in vivo as a precursor substance for producing compounds such as vitamin A, squalene, cholesterol, vitamin D, steroid hormones, carotene, and polyprenols and participates in the production of cell membranes so that it is an important substance for living organisms.

Preferably, no mevalonic acid is present in the process of producing rice wine since it is a growth factor for hiochi bacteria. In the present invention, however, addition of it together with the component (i) to bread dough enables to obtain the effects of improving flavor (fragrance and taste), volume, and shape. More specifically, foams generated upon fermentation become finer and more uniform and bread that has a sufficient volume, a thin crust and fine texture can be obtained. The reason for this is unclear. It would be considered that in particular, during the main kneading step, etc., a portion of gluten is collapsed by kneading an intermediate seed and wheat flour. However, it is considered that when the quality improver of the present invention as described above is used, gluten is protected thanks to the coexistence of mevalonic acid, which is a precursor substance for biosynthesis.

In the present invention, the combined use of mevalonolactone with the above biotin is preferred since the effects of the present invention are exhibited more.

The above component (i), biotin and mevalonic acid (mevalonolactone) are natural food materials that have conventionally been taken up as components useful for human body. In the present invention, in addition to these, there may further be added according to circumstances each of the following components so as to be used in place of chemical synthetic additives such as an oxidizing agent and yeast food.

The quality improver for producing bread of the present invention desirably further contains a lactic acid fermentation product of soy bean. As the lactic acid fermentation product of soy bean, one that is produced by the following steps (a) and (b) or one that is produced by the steps (a), (b) and (c) is used preferably.

(a) a step of steaming powder of shelled soy bean and enzymatically digesting the powder with an enzyme originated from *Aspergillus Orizae*, (b) a step of inoculating the enzymatically digested product obtained in (a) above with lactic acid bacteria and incubating them, and (c) a step of inoculating the lactic acid fermentation product obtained in (b) above with Propionibacterium shermanii and/or yeast and incubating them.

The production method for lactic acid fermentation product of soy bean by the above steps is described in detail in Japanese Examined Patent Publication No. Hei 8-43, the contents of which is incorporated herein by reference. To explain briefly, as the lactic acid bacteria to be inoculated to the enzymatically digested product in the step (b) is preferably a mixture of *Lactobacillus bulgaricus* and *Streptococcus thermophilus*.

The quality improver for producing bread desirably contains 10 to 100 parts by weight of the lactic acid fermentation product of soy bean as described above per 100 parts by weight of the component (i) on a dry basis. The effects of the present invention can be obtained more effectively by inclusion of the lactic acid fermentation product of soy bean as described above.

The quality improver for producing bread of the present invention may further contain other components in addition to the above components so long as the effects of the present invention are not damaged. It is preferred that such optional components be also natural food materials.

Such components include, for example, cystine. Cystine is added in an amount of preferably 5 to 35 parts by weight per 100 parts by weight of the component (i) on a dry basis.

The quality improver for producing bread of the present invention may contain those components usually added to bread dough, if desired. More specifically, it is preferred that saccharides such as sucrose, glucose, trehalose, and maltose, and further saccharifying enzymes such as α-amylase, glucoamylase, glucose oxidase, and protease, koji, etc. are added suitably to supply sugars that are assimilated by yeast.

Furthermore, lactic acid bacteria, lactic acid fermentation products such as yogurt, oils and fats such as vegetable oils, margarine, and butter, fruit such as raison may be suitably selected and added. The amount of each of optional components may be in the range where the conventional technology is applied and bread producing properties are not damaged. Of course the components may be used in combination. It is needless to say that the optionally added components are preferably natural materials.

Out of the quality improver for producing bread of the present invention, particularly preferred embodiments include specifically, for example, one that contains malt (component (i)), biotin and mevalonolactone, one that further contains a lactic acid fermentation product of soy bean in addition to the above, one that further contains cystine (L), and one that further contains other saccharides, and saccharifying enzyme such as glucose oxidase (G), protease (P), and an amylase-containing enzyme.

Further, the combinations also include one in which the above component (i) is a fermented rice product, and one in which the component (i) contains both malt and a fermented rice product.

The quality improver for producing bread of the present invention may be in the form of a preliminary mixture (master batch) that contains a portion of cereal used for producing bread in advance.

For example, one that contains 90 parts by weight or more, preferably 90 to 95 parts by weight, is used advantageously.

The method for producing bread comprises using the quality improver for producing bread as described above. Each component may be added upon producing bread to cereal powder for producing bread simultaneously and separately or upon preparing a seed dough, main kneading, or both. However, in the present invention, the quality improver is used in place of the conventional emulsifiers, yeast foods, or oxidizing agents, and at least added to seed dough. It is preferred that an additional portion of the quality improver be added when main kneading of seed dough with wheat flour is conducted.

The cereal powder for producing bread includes powders of wheat, rice, barley, rye, and corn that are generally used as a starting material for producing bread. In the present invention, these cereal powders can be suitably selected and used. It is also possible to add powder of beans such as soy bean thereto. Wheat powder usually used is strong flour. However, depending on the kind of bread desired, powder exclusively for French roll may be suitably selected. Alternatively, weak flour, intermediate flour, wheat gluten, starch, processed starch, α-converted starch, corn starch or the like may be mixed suitably. Usually, table salt is added to a bread dough according to a conventional method in a place depending on the kind of seed. Upon producing bread, components usually added to bread dough and further shortening, powder milk, etc. may be used as needed. In this case, it is preferred not to use chemical synthetic products.

It is preferred that the quality improver for producing bread as described above is used in such an amount that the component (i) is about 0.01 to about 0.2 part by weight, more preferably 0.03 to 0.1 part by weight, per 100 parts by weight of the total cereal powder for producing bread. In this case, the other components are used in amounts described above per 100 parts by weight of the component (i).

Yeast may be suitably selected from known ones such as raw yeast, dry yeast, and natural yeast species.

The seed dough can be obtained by kneading cereal powder for producing bread, yeast, the quality improver for producing bread as described above and water. Depending on the method of using an intermediate seed (sponge dough) or a straight seed, the above-described optionally used components, e.g., sugars and table salt may be added suitably or the amount of water to be used and conditions for primary fermentation may be selected suitably depending on the difference in application of the intermediate seed or straight seed.

In the present invention, by addition of the quality improver for producing bread as described above, a bread dough (seed dough) that is not sticking, spreads well at the time of molding or develops well and is excellent in mechanical resistance can be obtained.

The present invention also provides the seed dough.

The seed dough provided by the present invention is a primary fermentation product but after storage at low temperatures, for example, by refrigeration, the effects of giving bread excellent in flavor (fragrance and taste), volume, shape, etc. are not decreased. Therefore, it can be utilized by circulating in a cold storage or further in a frozen state. Storage and circulation at low temperatures are realized by conventional means and usually are effected at about 10° C. or less.

The seed dough as described above may be fermented as it is or after further addition of cereal powder and baked. The conditions for producing bread may be in accordance with the conditions for making ordinary bread depend on the kind of seed. Specifically, when plain bread is produced using the seed dough as constituting the total amount of raw materials for bread, a seed dough containing table salt and a sugar may be placed in an oven after division and ventilation, charged in a mold and heated (subjected to finish fermentation), and baked. When it is used as an intermediate seed, cereal powder and/or the above bread dough containing table salt and a sugar may be added to a seed dough that contains no table salt nor sugar, followed by main kneading and then performing the subsequent steps after the division in the same manner as described above.

In the present invention, the time for heating in an oven in this case may be shortened. For example, when the emulsifier, yeast food, oxidizing agent or the like for a seed dough that conventionally takes about 50 minutes to about 1 hour for heating in an oven is replaced by the quality improver of the present invention, bread having a good flavor and a good feeling upon eating and a good shape can be obtained even when the time for heating in an oven is shortened to about 30 minutes.

The shape of plain bread is not limited in any manner and may be of Pullman type, English bread type, or the like. In the present invention, bread in the shape of plain bread is most convenient for confirming the effects of the present invention but the present invention is not intended to be limited to the production of plain bread and any type of bread including bread obtained by using no mold such as rolled bread, confectionery bread, steamed bean jam buns, etc. so long as the above seed dough can be used. In each case, bread having an excellent flavor and having a sufficient volume and particularly good shape can be obtained. In particular, plain bread obtained in the present invention has a good flavor, a soft feeling upon eating, fine texture, and a thin crust and is difficult to be aged.

The present invention also provides bread produced from natural materials that is obtained as described above and contains vitamins, proteins and minerals abundantly.

By varying the kind of powder and amount of water, French roll having a hard crust, etc. can be obtained with ease.

The feature of the present invention, which are believed to be novel are set forth with particularity in the appended claims. The invention, together with objects and advantages thereof, may best be understood by reference to the following description of the presently preferred embodiments and all variation which come within the meaning and range of equivalency of the claims are therefore intended to be embraced therein.

EXAMPLES

The present invention will be described in more detail by examples. However, the present invention is not limited thereto. Unless otherwise described specifically, all parts are parts by weight.

Examples 1 to 4

Bread was produced using the quality improvers for producing bread having the compositions shown in Table 1 below.

TABLE 1

(Composition being indicated in part by weight)

|  | Example 1 | Example 2 | Example 3 | Example 4 |
|---|---|---|---|---|
| Fermented rice powder (water content: 5%) | — | — | 5 | 5 |
| Malt powder (water content: 2.72%) | 5 | 10 | — | — |
| Mevalonolactone | 0.01 | 0.01 | — | 0.1 |
| Biotin | 0.01 | 0.01 | 0.1 | 0.1 |
| Cystine | 0.65 | 0.65 | 1 | 1 |
| Lecithin | 1.0 | 1.0 | — | — |
| Enzyme (G) | 0.02 | 0.02 | 0.1 | 0.1 |
| Enzyme (P) | 0.005 | 0.005 | 0.01 | 0.01 |
| Fermentation product of soy bean (water content: 5%) | 1.2 | 1.2 | 3 | 3 |

Wheat flour was added to make 100 parts by weight.

In Table 1 above,
Enzyme (G): Crude enzyme containing glucose oxidase (10,000IU)
Enzyme (P): Crude enzyme containing protease and amylase.

The lactic acid fermentation product of soy bean was produced as follows.

To 20% of powder of shelled soy bean steamed for 20 minutes were added 77.9% of sterilized water and 0.02% of an enzyme originated from *Aspergillus Oryzae* and digestion was allowed to occur at 40° C. for 30 minutes. To this was added 2% of starter inoculated with *Lactobacillus bulgaricus* and *Streptococcus thermophillus* and the mixture was incubated at 37° C. for 5 hours to obtain a lactic acid fermentation product of soy bean.

Bread was produced using each of the quality improvers (preliminary mixtures with wheat flour) 1 to 4 shown in Table 1.

[Intermediate Seed (Sponge dough)]

|  | (Part by weight) |
|---|---|
| Strong flour | 70 |
| Quality improvers 1 to 4 shown in Table 1 | 1 |
| Emulsifier | 0.3 |
| Water | 40 |

Kneading temperature 24° C. (L3, H6), fermentation: 4 hours

| [Main Kneading] | |
|---|---|
| Strong flour | 30 |
| Sugar converted | 6 |
| Table salt | 1.8 |
| Powder milk | 2 |
| Shortening | 6 |
| Water | 24 |

Kneading temperature 27.5° C. (L3, H7;L2, H5)

| [Floor Time] | 20 minutes |
|---|---|
| [Division] | 290 g U-type 5 vials |
| [Bench Time] | 20 minutes |
| [Heating] | 38° C. (85%), 50 minutes |
| [Baking] | 210° C., 40 minutes |

As Reference Example, plain bread was produced according to a conventional intermediate seed method by replacing 1 part by weight of the quality improver in this example for 0.1 part by weight of yeast food and 0.3 part by weight of an emulsifier.

In the above Examples, use of any of the quality improvers 1 to 4 gave seed doughs that spread as good as Reference Example and showed no stickiness. Also, they showed good development and good mechanical resistance. Final bread products had a sufficient apparent volume, a thin crust, fine grain, a soft feeling upon eating, an excellent flavor and an excellent durability of flavor.

When the quality improver of the present invention is used, bread having an extremely good flavor (fragrance and taste), a sufficient volume and a good shape, and a soft feeling upon eating can be obtained. Use of the quality improver for producing bread produced of natural materials in place of the conventional chemical synthetic additives results in that the above effects can be obtained and there can be obtained bread as a health-care food that contains no chemical synthetic product but contains vitamins, proteins, and minerals abundantly. Further, the quality improver seed dough for producing bread can exhibit the above effects even after stored at low temperatures and can be circulated as well as can reduce works upon producing bread.

What is claimed is:

1. A quality improver for producing bread, comprising at least one component (i) selected from the group consisting of malt, rice fermentation product, and wheat fermentation product and (ii) biotin.

2. The quality improver for producing bread as claimed in claim 1, further comprising mevalonolactone and/or mevalonic acid.

3. The quality improver for producing bread as claimed in claim 1, further comprising lactic acid fermentation product of soy bean.

4. The quality improver as claimed in claim 1, wherein the biotin is added in an amount of 0.1 part by weight or more per 100 parts by weight of the component (i) on a dry basis.

5. The quality improver as claimed in claim 2, wherein the mevalonolactone is added in an amount of 0.1 part by weight or more per 100 parts by weight of the component (i) on a dry basis.

6. The quality improver as claimed in claim 3, wherein the lactic acid fermentation product of soy bean is contained in an amount of 10 to 100 parts by weight per 100 parts by weight of the component (i) on a dry basis.

7. A seed dough comprising cereal powder, yeast, and a quality improver for producing bread as claimed in claim 1, the cereal powder, yeast and the quality improver being kneaded and subjected to primary fermentation.

8. A method for producing bread comprising using cereal powder, yeast, and a quality improver for producing bread as claimed in claim 1.

9. A bread product produced by the method as claimed in claim 8.

* * * * *